United States Patent
Bacsa

[19]

[11] Patent Number: 5,841,129
[45] Date of Patent: Nov. 24, 1998

[54] DEVICE FOR OPTICAL SCANNING OF OBJECTS ON A SCANNING SURFACE AND PROCESS FOR OPERATING IT

[76] Inventor: Wolfgang Bacsa, Avenue Chanel 10, CH-1110 Morges, Switzerland

[21] Appl. No.: 765,335
[22] PCT Filed: Apr. 29, 1996
[86] PCT No.: PCT/CH96/00165
   § 371 Date: Mar. 3, 1997
   § 102(e) Date: Mar. 3, 1997
[87] PCT Pub. No.: WO96/35136
   PCT Pub. Date: Nov. 7, 1996

[30] Foreign Application Priority Data

May 2, 1995 [CH] Switzerland .................. 01 240/95

[51] Int. Cl.$^6$ ........................................ H01J 3/14
[52] U.S. Cl. ............... 250/216; 250/559.27; 356/382
[58] Field of Search ......................... 250/216, 234, 250/309, 310, 559.27; 356/357, 358, 376, 381, 382; 359/370, 894

[56] References Cited

U.S. PATENT DOCUMENTS 4,604,520   8/1986   Pohl ........................................ 250/216
4,621,911  11/1986   Lanni et al. .
5,286,970   2/1994   Betzig et al. ........................... 359/894

OTHER PUBLICATIONS

Applied Optics, vol. 31, No. 22, 1 Aug. 1992, pp. 4515–4518, XP000292096, Norihiro Umeda et al: "Scanning Wiener–Fringe Microscope with an Optical Fiber Tip".

*Primary Examiner*—Que Le
*Attorney, Agent, or Firm*—Limbach & Limbach LLP

[57] ABSTRACT

The optical monitoring of a standing wave by an optical probe (5) in the region of the overlap beween an incident and reflected monochromatic light beam in the region of the surface of a substrate consisting of a transparent (2) and an opaque (1) layer faciliates an optical holographic image with improved lateral resolution. The lateral resolution is limited by the optical fields in the edge region of the probe (11) and not directly by the expansion of the probe aperture. The lateral resolution is additionally increased by the one-sided coating of the probe and narrowing the probe aperture in the direction of the incident light beam.

13 Claims, 5 Drawing Sheets

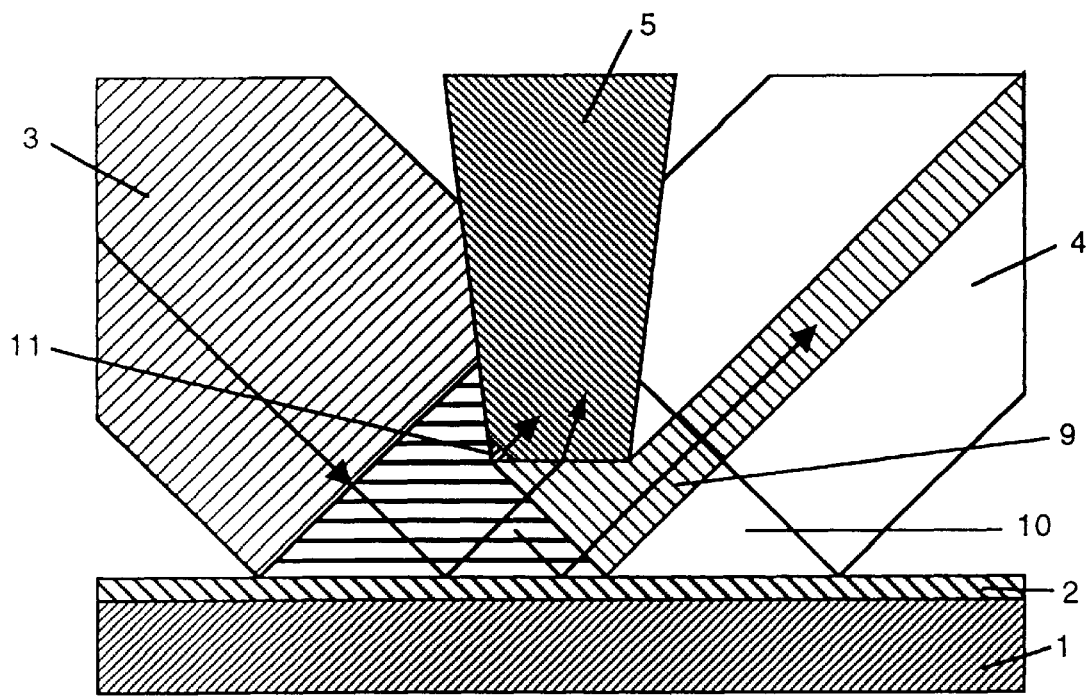
Fig. 3.a
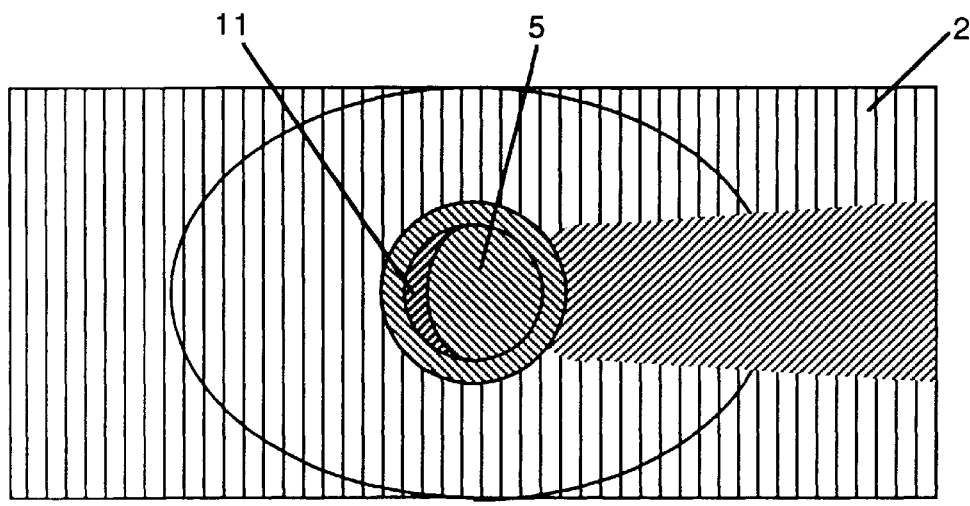
Fig. 3.b

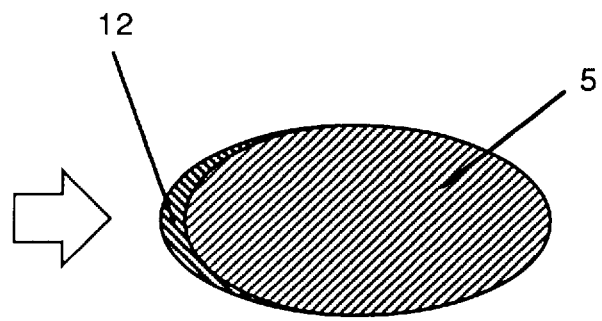
Fig. 4.a
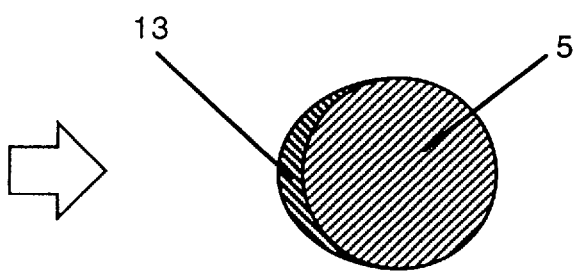
Fig. 4.b

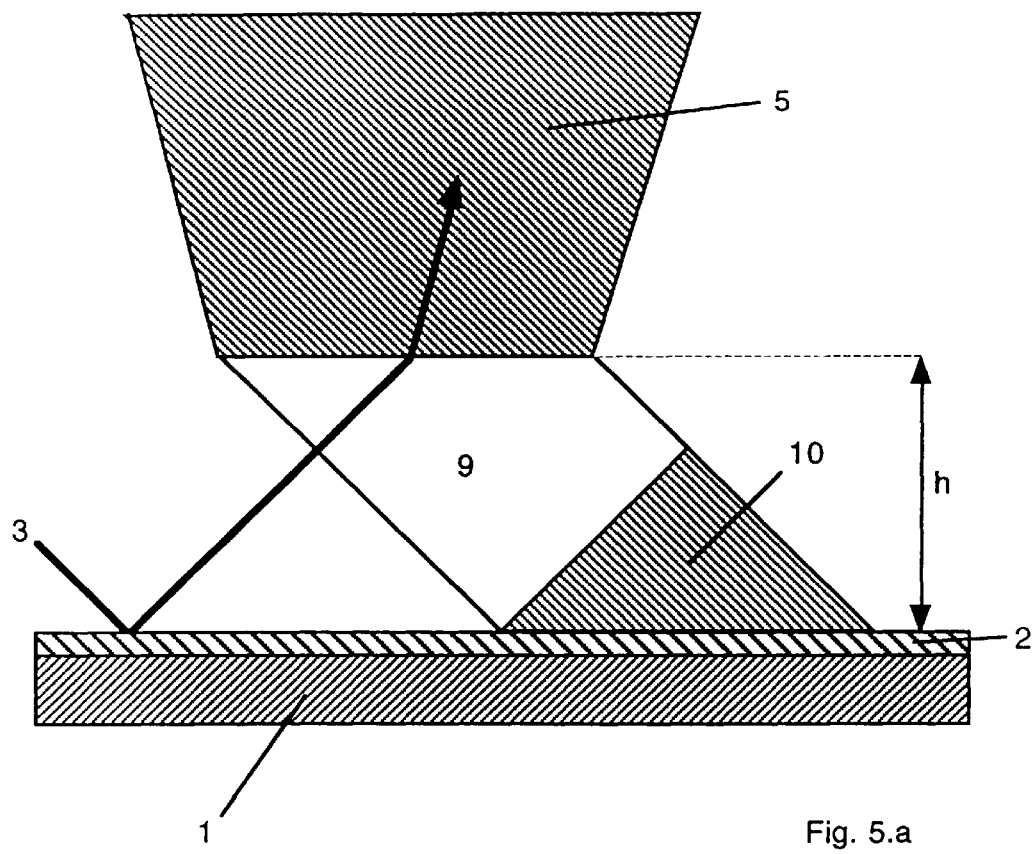
Fig. 5.a
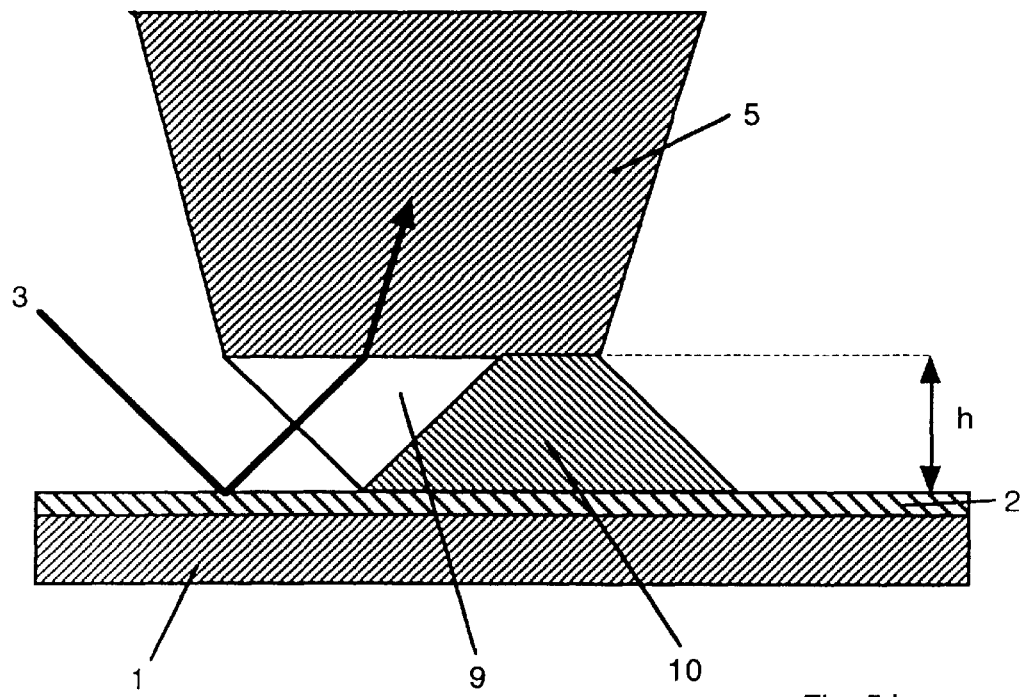
Fig. 5.b

DEVICE FOR OPTICAL SCANNING OF OBJECTS ON A SCANNING SURFACE AND PROCESS FOR OPERATING IT

BACKGROUND OF THE INVENTION

1. Field of the Invention

The invention concerns a device for the optical scanning of objects on a scanning surface and processes for operating the same.

2. Description of the Related Art

The scanning of an optical probe with an aperture smaller than the wavelength of light makes it possible to increase the optical resolution (D. W. Pohl, W. Denk, M. Lanz, Applied Physics Letters 44 (1984) 651). For such a process the resolution is limited by the size of the aperture.

The scanning of an optical probe near an object can be improved by the use of an interaction field between the probe and the object. A process is known for the control of the distance between the probe and surface using evanescent optical surface waves (R. C. Reddick, R. J. Warmack, T. L. Ferrell, Physical Review B 39 (1989) 767). Another process is known where the damping of the modulation frequency (shear force interaction) of the probe is used near the surface (E. Betzig, P. L. Finn, J. S. Weiner, Applied Physics Letter 60 (1992) 2484).

In these and other known processes, the optical probe has been mostly used to illuminate the surface. An increased resolution through a smaller aperture has the consequence that less light is transmitted through the probe and the maximal amount of transmitted light is reduced with smaller aperture which limits the resolution.

An optical process is known through which the Raman sensitivity of adsorbates is increased by the use of a metallic substrate layer and a transparent surface layer (W. S. Bacsa, J. S. Lannin, Applied Physics Letters 61 (1992) 19). This has the effect that an interference maximum of the standing wave, produced through the interference of the incident and reflected light beams, falls on the surface of the transparent layer. This local enhanced light intensity on the surface increases the Raman-signal of adsorbates and ultra-thin layers.

A process is known where standing optical waves near a surface are used to control the movement of an optical probe parallel to the surface (N. Umeda, Y. Hayashi, K. Nagai, A. Takayanagi, Applied Optics, 31 (1992) 4517).

The use of the probe as a light collector for detection has the advantage that even when the amount of transmitted light is limited by the aperture, the maximal intensity of the incident light beam is not limited by the probe aperture. This process is, however, not particularly sensitive to adsorbates and ultra-thin layers due to the fact that the local light intensity is small near opaque surfaces.

SUMMARY OF THE INVENTION

The invention uses the surface of a planar microcavity as a scanning surface. The microcavity can be realized through a transparent layer on top of an opaque layer. Even though the reflectivities of the interfaces of the transparent layer are not very high, the superposition of the reflected waves at the two interfaces is analogous to those in a microcavity. The standing wave is very sensitive to adsorbates and ultra-thin layers when an appropriate thickness is selected for the tansparent layer. Because the standing wave has a minimum at the interface between the opaque and the transparent layer, the optimal thickness of the transparent layer is approximately a multiple of $L/4$ ($L$=wavelength of the standing wave) so that an interference maximum falls on the surface. The exact optimal thickness of the transparent layer is given by the penetration depths of the standing wave into the opaque layer and the optical density of the transparent layer. The sensitivity of the standing wave to adsorbates depends also on the optical properties of the reflecting substrate layer and the transparent surface layer. Due to the selected thickness of the transparent surface layer, the light reflected and scattered from the surface interferes destructively with the light reflected from the opaque layer. This has the effect that the light reflected and scattered from the surface has a maximal influence on the standing wave.

Apart of the increased sensitivity of the standing wave to single adsorbates, the local light intensity is enhanced on the surface of the microcavity which in turn enhances all optical processes (absorption, luminescence, inelastic light scattering, non-linear optical processes). The spectral decomposition of the detected light can be used to spectroscopically investigate single adsorbates and their local chemical and physical properties. It is interesting to note that inelastic incoherent optical processes do not contribute to the standing wave. The polarisation of the incident and detected light can in addition be analysed and be used for the magnetic characterization of adsorbates.

The modification of the standing wave by the adsorbate of dimension smaller than the used wavelength of light, is, due to diffraction of the light wave on the adsorbate considerably larger. It, therefore, becomes possible to image adsorbates which are smaller than the aperture of the optical probe.

Further advantages result from the selected geometry for the incident light beam and substrate:

The coherent superposition of the incident and reflected light beams in the region of the overlapping light beams is an interferogram and a hologram of the surface. This holographic image differs from conventional holographic imaging processes due to the small object-probe distance in comparison to the wavelength. The two and three dimensional optical scanning near the surface makes it possible to record two and three dimensional holograms. It is then possible to reconstruct the surface from the hologram (Goodman, Joseph W. Introduction of Fourier Optics, McGraw-Hill, New York, 1968).

In order to facilate the approach of the optical probe to the surface, a second incident beam with the same wavelength and a different angle of incidence or a light beam with a different wavelength can be used. The phase shift of the incoherent superposition of the two standing waves can be used as a distance indicator for the optical probe to the surface.

Up to now, adsorbates have been mostly investigated on a transparent substrate and in transmission geometry. According to this invention the local intensity on the surface of the non-transparent substrate in the form of a microcavity is considerably higher. Also, the reflection geometry is easier to employ and of advantage. The optical probe does not have to be modulated according to this invention and is therefore easier to realize.

BRIEF DESCRIPTION OF THE DRAWINGS

The invention is described in the following, in more detail through figures which show simply one possible implementation.

FIGS. 3A and 3B show the influence of the optical probe on the standing wave with shadow region 9 and shadow region 10 and the edge zone of the probe 11.

FIG. 4a shows an elliptically shaped aperture and edge zone 12. FIG. 4b shows a light absorbing layer 13 coated on one side.

FIGS. 5a and 5b show the dependence of the extent and shape of shadow region 10 on the distance of the probe 5 from the substrate.

DETAILED DESCRIPTION OF THE DRAWINGS

Figure 1:
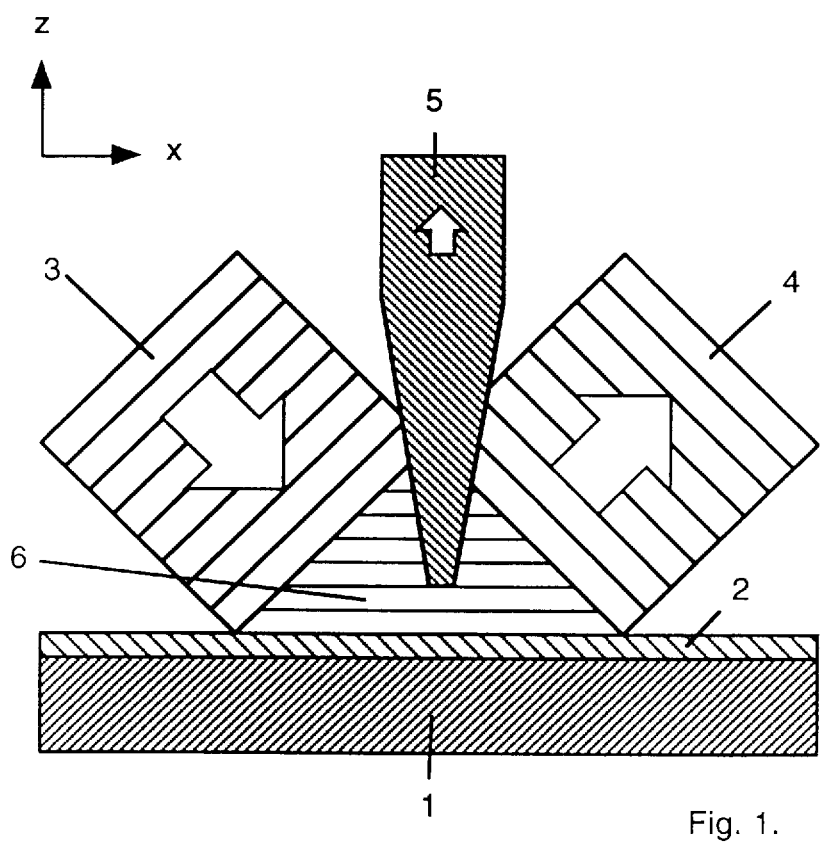
FIG. 1 shows the substrate, a microcavity which consists of an opaque layer 1 and a transparent surface layer 2, incident light beam 3, reflected light beam 4 and optical probe 5.
Figure 2:
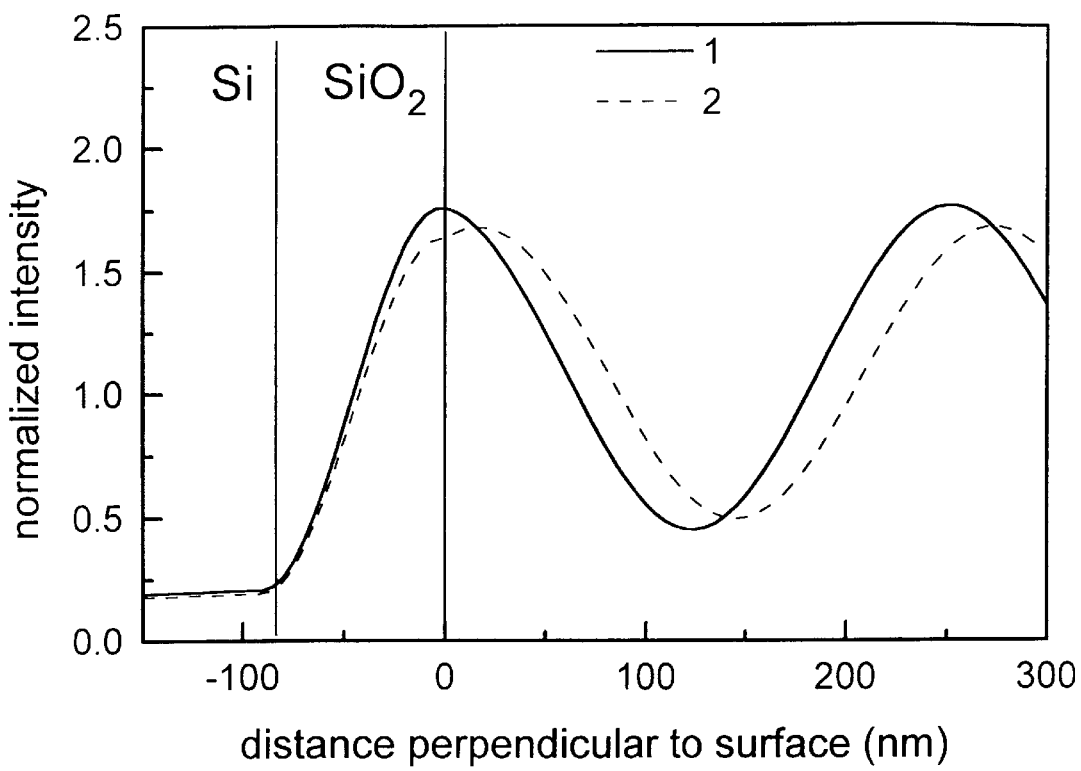
FIG. 2 hows the calculated intensity function 7 of the standing wave in the direction perpendicular to the surface of the substrate and the corresponding function 8 for a one monolayer thick adorbate layer.

A silicon-wafer 1 and a transparent silicon oxide layer 2 can be used as substrate. A laser can be used as a monochromatic light source. For a monochromatic light beam of wavelength 514 nm of an argon ion laser and an angle of incidence of 57 degrees, the optimal layer thickness of the silicon oxide layer is 105 nm. The light source has to be sufficiently monochromatic and coherent so that a standing wave can be formed in the proximity of the surface. The standing wave 6 is limited to the zone of overlap of the incident and reflected beams.

A pointed optical fiber can be used as an optical probe 5. The collected light which propagates in the fiber can be directly guided to a spectrometer and detector. By using a polarizer for the light trasmitted through the optical probe, the polarization of the transmitted light can be monitored. The polarization of the incident light beam can be changed by a polarizer or by adjusting the polarization of the light source.

The intensity distribution near the surface has been calculated using a well known matrix formalism for interference in multi-layers (M. V. Klein, T. E. Furtak, 'Optics', John Wiley&Sons, page 295, 1986). As an adsorbate layer, a monoatomic layer of Al (thickness 0.4 nm) has been chosen. The adsorbate layer displaces the standing wave 8 by 21 nanometer and reduces the amplitude of the maxima and minima of the intensity function. The incident light beam is diffracted for adsorbates smaller than the wavelength of light and causes a disturbance of the standing wave which spreads in the lateral direction. With increasing distance from the substrate, the scattered wave front gets larger. For adsorbates much smaller than the wavelength of the standing wave the wave, amplitude gets smaller with increasing distance from the adsorbate.

Adsorbates can be distinguished from surface steps through the difference in optical properties which result in changes of the local intensity of the standing wave as a function of the perpendicular distance from the substrate, provided diffraction effects are small in the investigated region.

The detected signal intensity from the optical probe can be used in a feed back loop to control the optical probe near the substrate surface. The probe can be moved over the surface at constant distance (phase) or holding the signal (amplitude) constant. In order to keep the phase constant, one has to measure the change in a direction perpendicular to the surface at each image point. This can be realized by modulating the optical probe perpendicular to the substrate.

FIG. 3 shows the influence of the optical probe on the standing wave. The illumination of the probe on one side causes a shadow region. Some of the reflected light falls in region 9. Neither the incident nor the reflected light enters shadow region 10. The penetration of the standing wave at the edge of the probe results in a propagating wave in the probe. The lateral resolution is limited by the penetration of the optical fields in the edge region of probe 11 on the side of the incident light beam and is not directly limited by the size of the probe aperture. The influence of diffraction effects in the formation of the shadow region is larger as the probe gets smaller. It follows that the shadow region is less pronounced when the size of the probe tip is comparable or smaller than the wavelength of light.

The lateral resolution can be enhanced by reducing the light penetration at the edge of the probe. This can be realized through a smaller aperture, change of the aperture shape, tilting of the optical probe with respect to the surface or by coating one side of the probe with an absorbing material. FIG. 4a shows an elliptic aperture through which the interaction with the light in zone 12 can be reduced. FIG. 4b shows how a coating on one-side 13 can reduce the light which penetrates the probe. The one-sided coating has the additional advantage in that the amount of penetrating light can be adjusted by changing the orientation of the probe with respect to the incident beam. This makes it possible to change the lateral resolution continuously with a single probe.

The reflected light in region 9 in FIG. 3 can propagate in the optical probe and gives rise to a constant background signal. FIG. 5 shows how the region 9 is changed with smaller probe substrate distance. In the proximity of the surface, region 9 is the amount of light which is reflected into the probe reduced due to the penetration of the probe in region 10. The reduction of the constant background signal can be used as a distance indicator for the proximity of the substrate.

What is claimed is:

1. A device for the optical scanning of objects on a scanning surface, the device comprising: a substrate including an opaque layer and a transparent layer, the transparent layer having a scanning surface and being disposed on the opaque layer; a light source for producing a monochromatic light beam incident on the scanning surface; and an optical probe for monitoring a monochromatic standing wave formed by the superposition of the monochromatic light beam and a reflected beam, the optical probe being displaceable with respect to the scanning surface and having an aperture oriented towards the scanning surface, wherein the transparent layer is transparent to the monochromatic light beam.

2. The device according to claim 1, characterized in that the thickness of the transparent layer is selected such that the intensity of the monochromatic standing wave does not have a local minimum at the scanning surface.

3. The device according to claim 2, characterized in that the thickness of the transparent layer is selected such that the intensity of the monochromatic standing wave does have a local maximum at the scanning surface.

4. The device according to claim 3, characterized in that the optical probe is at least on one side laterally coated with an opaque material.

5. The device according to claim 4, characterized in that a projection of the aperture on the scanning surface is oblong in shape.

6. The device of claim 5, characterized in that the size of the aperture is larger than the wavelength of the monochromatic light beam.

7. The device of claim 5, wherein the oblong shape is elliptical.

8. A process for operating an optical scanning device comprising the steps of:
  providing an optical scanning device comprising:
    a substrate including an opaque layer and a transparent layer, the transparent layer having a scanning surface and being disposed on the opaque layer;
    a light source for producing a monochromatic light beam incident on the scanning surface; and
    an optical probe for monitoring a monochromatic standing wave formed by the superposition of the monochromatic light beam and a reflected beam, the optical probe being displaceable with respect to the scanning surface and having an aperture oriented towards the scanning surface,
    wherein the transparent layer is transparent to the monochromatic light beam;
  scanning the optical probe over the scanning surface;
  wherein during the scanning step, the distance of the probe from the scanning surface is controlled such that the phase of the monochromatic standing wave at the aperture is kept constant.

9. A process for operating an optical scanning device, comprising the steps of:
  providing an optical scanning device comprising:
    a substrate including an opaque layer and a transparent layer, the transparent layer having a scanning surface and being disposed on the opaque layer;
    a light source for producing a monochromatic light beam incident on the scanning surface; and
    an optical probe for monitoring a first monochromatic standing wave formed by the superposition of the monochromatic light beam and a reflected beam, the optical probe being displaceable with respect to the scanning surface and having an aperture oriented towards the scanning surface,
    wherein the transparent layer is transparent to the monochromatic light beam;
  scanning the optical probe over the scanning surface;
  wherein during the scanning step, the distance of the probe from the scanning surface is controlled such that the intensity of the first monochromatic standing wave at the aperture is kept constant.

10. A process for operating an optical scanning device according to claim 9, wherein during the scanning step, the distance of the probe from the scanning surface is determined by monitoring a background signal caused by partial penetration into the aperture of the reflected beam.

11. A process for operating an optical scanning device according to claim 10, wherein during the scanning step, a second monochromatic standing wave of different wavelength from the first monochromatic standing wave is produced and the phase shift between the first monochromatic standing wave and the second monochromatic standing wave is monitored.

12. A process for operating an optical scanning device, the process comprising the steps of:
  providing an optical scanning device comprising:
    a substrate including an opaque layer and a transparent layer, the transparent layer having a scanning surface and being disposed on the opaque layer:
    a light source for producing a monochromatic light beam incident on the scanning surface; and
    an optical probe for monitoring a monochromatic standing wave formed by the superposition of the monochromatic light beam and a reflected beam, the optical probe being displaceable with respect to the scanning surface and having an aperture oriented towards the scanning surface,
    wherein the transparent layer is transparent to the monochromatic light beam;
  collecting the monochromatic standing wave with the probe, and
  spectroscopically analyzing the monochromatic standing wave collected by the probe.

13. A process for operating an optical scanning device, the process comprising the steps of:
  providing an optical scanning device comprising:
    a substrate including an opaque layer and a transparent layer, the transparent layer having a scanning surface and being disposed on the opaque layer;
    a light source for producing a monochromatic light beam incident on the scanning surface; and
    an optical probe for monitoring a monochromatic standing wave formed by the superposition of the monochromatic light beam and a reflected beam, the optical probe being displaceable with respect to the scanning surface and having an aperture oriented towards the scanning surface,
    wherein the transparent layer is transparent to the monochromatic light beam;
  collecting the monochromatic standing wave with the probe, and
  monitoring the polarization of the monochromatic standing wave collected by the probe.

* * * * *

UNITED STATES PATENT AND TRADEMARK OFFICE
CERTIFICATE OF CORRECTION

PATENT NO. : 5,841,129
DATED : 11/24/98
INVENTOR(S) : Bacsa

It is certified that error appears in the above-identified patent and that said Letters Patent is hereby corrected as shown below:

Column 6, line 20, after "surface" add --and for the collecting light,--.

Column 6, line 23, after "wave" add --and light--.

Column 6, line 25 – 26 delete "monochromatic standing wave" and substitute --light--

Signed and Sealed this

Ninth Day of March, 1999

*Attest:*

*Attesting Officer*

Q. TODD DICKINSON

*Acting Commissioner of Patents and Trademarks*

UNITED STATES PATENT AND TRADEMARK OFFICE
CERTIFICATE OF CORRECTION

PATENT NO.: 5,841,129
DATED: November 24, 1998
INVENTOR(S): WOLFGANG BACSA

It is certified that an error appears in the above-identified patent and that said Letters Patent is hereby corrected as shown below:

Column 6, line 20, change "and for the collecting light," to -- and for collecting light --.

Signed and Sealed this

Seventh Day of September, 1999

Q. TODD DICKINSON

Attest:

Attesting Officer

Acting Commissioner of Patents and Trademarks